F. REESE.
Shovel Plow.
No. 82,990. Patented Oct. 13, 1868.
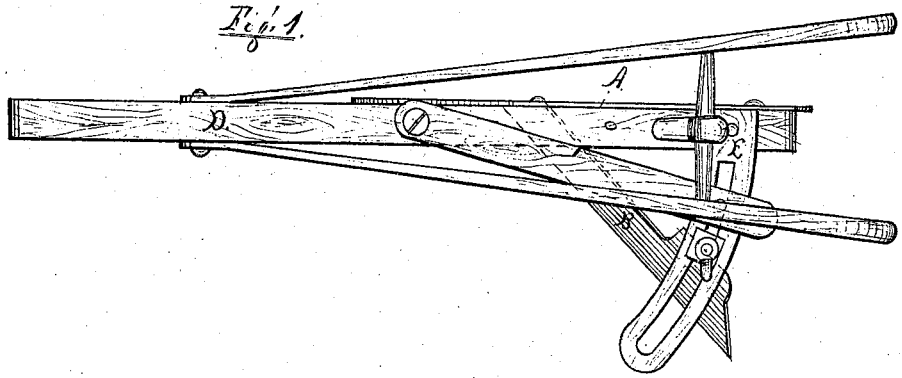
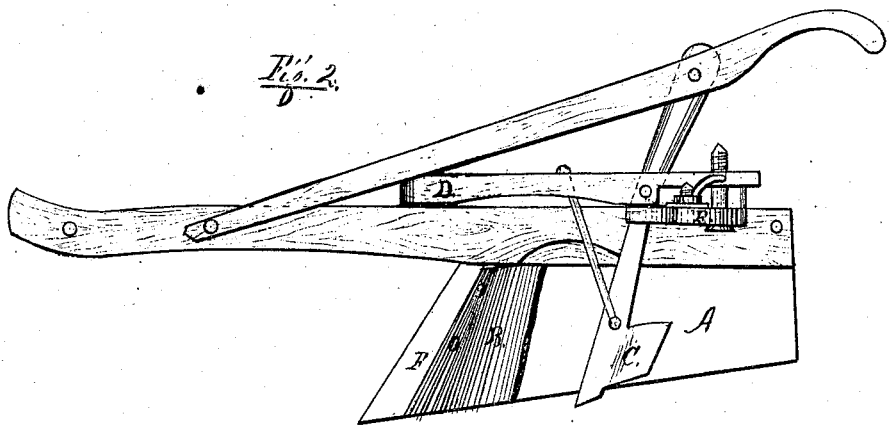
Witnesses.
M. T. Porter
Alberto Martin
Inventor.
Francis Reese

FRANCIS REESE, OF ELYTON, ALABAMA.

Letters Patent No. 82,990, dated October 13, 1868.

IMPROVEMENT IN PLOWS.

The Schedule referred to in these Letters Patent and making part of the same.

*To all whom it may concern:*

Be it known that I, FRANCIS REESE, of Elyton, in the county of Jefferson, and State of Alabama, have invented a new and useful Improvement in a Plow, called "The Young-Plant Cultivator;" and I do hereby declare that the following is a full, clear, and exact description of the construction and operation of the same, reference being had to the annexed drawings, making part of this specification, to wit:

Ordinary Main Beam and Handles.

Letter A is the guide-plate which runs near the plant, and prevents the scraper from breaking the ground the plant stands on, and the hilling-plow from covering the plant. It is fastened to the main beam with two bolts, one before and one behind. It is two feet long at bottom, and one foot eight inches at top; fourteen inches wide in front, and twelve inches wide behind; three-eighths of an inch thick; and may be wrought or cast.

B is the scraper, which throws the clods, grass, and weeds from the plant. It is fastened to the guide-plate with two bolts, two inches from the front end of the guide-plate, and is also fastened with a temper-screw to circular beam E, and may be regulated by moving out or in. It is two feet long, ten inches wide in front, and twelve inches wide behind, three-eighths of an inch thick, and may be either wrought or cast.

C is the hilling-plow, which throws the dirt to the plant.

D is a movable beam, to which the hilling-plow is fastened, and by which, with the temper-screw, it may be regulated, elevated, lowered, or moved to right or left. It is fastened on top of the main beam by a screw or bolt in guide-plate A.

E is a circular bar, with circular mortise, which supports scraper and hilling-plow, both of which may be regulated by the circular mortise and temper-screws. It is two inches wide, sixteen inches long, and one inch thick, and is fastened with a bolt to main beam, two inches from the hinder end.

F is the cutting-point, which is fastened at the lower end with one bolt to the front end of the guide-plate, and the upper end of which is let into a notch in the main beam under the guide-plate. It is two inches wide, one-fourth of an inch thick, and fifteen inches long, and the hole through which the bolt goes is long, so as to let it up or down. It has a sharp point, and the front edge is sharp.

I claim, as my invention, the guide-plate, and the combination of the scraper, hilling-plow, and other parts, as described.

FRANCIS REESE.

Witnesses:
M. T. PORTER,
WM. S. MORROW.